United States Patent Office 2,935,415
Patented May 3, 1960

2,935,415

OXYGEN-CONTAINING THERMOPLASTIC COMPOSITIONS

Jack Linsk, Highland, Ind., assignor to Standard Oil Company, Chicago, Ill., a corporation of Indiana No Drawing. Application October 28, 1955
Serial No. 543,595

5 Claims. (Cl. 106—189)

This invention relates to plastic compositions comprising synthetic polymeric base material plasticized with a normally solid plasticizer having low volatility.

Heretofore, plastic compositions have generally consisted of a major proportion of a plasticizable material plasticized with a minor proportion of liquid plasticizer which compositions sometimes soften at relatively low temperatures and from which compositions the plasticizer component or components tend to escape by evaporation. Such plastic compositions have been prepared by the use of a common solvent for contacting the polymeric material and plasticizer. The present invention is concerned with thermoplastic compositions which have relatively high temperature softening points, which contain a major amount of plasticizer component of relatively low volatility and which composition may be prepared by heating an intimate mixture of the plasticizable polymeric material with normally solid plasticizer.

An object of this invention is a thermoplastic composition containing a predominance of plasticizer. Another object of the invention is a plasticized composition comprising a plasticizable polymeric material component and a low volatility plasticizer component said components containing relatively high amounts of combined oxygen. A particular object of the invention is a thermoplastic composition suitable for use as binder material comprising principally a cellulose acetate polymeric material and dinitrophenoxyethanol-containing plasticizer. Other objects of the invention will be apparent from the description thereof set out hereinbelow.

The thermoplastic compositions of this invention comprise principally polymeric base material, preferably cellulose acetate polymeric material and a plasticizer consisting of dinitrophenoxyethanol or mixtures of dinitrophenoxyethanol with bis(dinitrophenoxy)ethane, said mixtures containing not more than 50 percent by weight of said bis(dinitrophenoxy)ethane. When it is desired to lower the softening point of the plasticized composition, an oxygen-containing adjunct plasticizer which has low volatility and which is capable of plasticizing the polymeric material to a significant degree, may be incorporated in the composition.

The cellulose ester, that is, cellulose acetate polymeric material, preferred in this invention is a partially esterified cellulose acetate described as having an acetic acid content between about 51 and 57 percent by weight. A commercial lacquer grade cellulose acetate, marketed as having an acetic acid content of 54–56% by weight acetic acid, that is, about 55% by weight acetic acid is particularly suitable. The term "percent by weight acetic acid" denotes the amount of acetic acid obtained on saponification of the cellulose acetate and is expressed as percent of the initial material. Another cellulose ester suitable as polymeric material for purpose of this invention is cellulose acetate-butyrate having an acetic acid content between about 7 and 55% by weight and a butyric acid content between about 16% and 61%. Still another polymeric base material suitable for my novel compositions is polyvinyl acetate. A particularly suitable polyvinyl acetate resin having a viscosity of about 800 centipoises as determined in a benzene solution containing 86 grams of the resin in 1000 cc. of the solution (at 20° C.) with an Ostwald viscosimeter. The lowest molecular weight polyvinyl acetate resin suitable as base material for the composition has a softening point above about 190° C.

The thermoplastic compositions of this invention contain from about 20% to about 40%, preferably about 20% to about 30% by weight, of the cellulose acetate polymeric material, the remainder of the composition being the hereafter defined plasticizer component.

The plasticizer may be dinitrophenoxyethanol, either pure or commercial grade, or it may consist of a mixture of dinitrophenoxyethanol with bis(dinitrophenoxy)ethane; the mixture contains not more than 50 weight percent of the bis(dinitrophenoxy)ethane constituent. The dinitrophenoxyethanol may be any one of the various isomeric species, such as 2,4-dinitrophenoxyethanol. The mixture, which may be utilized in the composition of the invention, is most commonly obtained as a mixture of primary reaction product and secondary reaction product in the preparation of the dinitrophenoxyethanol. The dinitrophenoxyethanol is the primary reaction product. By control of the reaction conditions utilized in the prior art methods for the preparation of dinitrophenoxyethanol, the reaction product may contain as little as 10 weight percent of the bis(dinitrophenoxy)ethane secondary reaction product to as much as or even more than 50 weight percent. Since it is necessary to have a plasticizer mixture containing not more than 50 weight percent of secondary reaction product, the total reaction product may require purification when it contains, as produced, more than this amount of a secondary reaction product.

The plasticizer mixture may be readily prepared by the method taught by Blanksma and Fohr, Rec. trav. chim. 65, 711 (1946) wherein dinitrochlorobenzene is reacted with ethylene glycol utilizing sodium as the condensing agent; or by the method of Fairbourne and Toms, J. Chem. Soc. 119, 2077 (1921) wherein caustic soda is used as the condensing agent. To illustrate: the preferred plasticizer mixture is prepared by reacting 3.5 mols of ethylene glycol with 1 mol of 2,4-dinitrochlorobenzene at a temperature in the range of about 80° to 95° C. for a contact time of about 4 hours, in the presence of 50% aqueous sodium hydroxide solution; about 1 part by weight of sodium hydroxide is used for each 5 parts of the dinitrochlorobenzene. The solid reaction product is removed from the liquid by filtration, water washed and dried at moderate temperature. Under these conditions the reaction product consists of about 63 weight percent of the primary reaction product, 2,4-dinitrophenoxyethanol and about 37 weight percent of the secondary reaction product, bis(2,4-dinitrophenoxy)ethane. It is to be understood that several methods of analysis are available and it has been found that the composition of the reaction product varies somewhat according to the analytical technique. For example, when utilizing differential solubility procedure the amount of the secdary reaction product is always greater than that found by direct analysis to determine the amount of 2,4-dinitrophenoxyethanol by acetylation, that is, by determination of the hydroxyl number of the mixture. If the mol ratio of ethylene glycol to 2,4-dinitrochlorobenzene is increased to about 10 to 1 the amount of bis(2,4-dinitrophenoxy)-ethane is reduced to about 10% by weight of the reaction product.

The primary reaction product dinitrophenoxyethanol can be separated by differential solubility utilizing a boiling mixture of toluene or benzene to contact the reaction product. Relatively pure dinitrophenoxyethanol is recovered from the aromatic solvent by evaporation of the aromatic solvent to a concentrated solution and fractional crystallization of the dinitrophenoxyethanol from this solution. It is understood that considerable variation in the relative proportions of the primary and secondary reaction produced in the product mixture may occur as a result of different methods of producing the dinitrophenoxyethanol-containing product and as a result of difference in operating conditions such as washing the product, ratio of intermediates in the reaction mixture, temperature, etc. For example, in producing the 2,4-dinitro species variation in product washing techniques with respect to amount of water and temperature of the water used for washing the product mixture may cause the relative amounts of primary and secondary reaction product to vary from about 60–65 parts by weight of primary reaction product to about 40–35 parts by weight of the secondary reaction product when using a 3.5 to 1 ratio of ethylene glycol to 2,4-dinitrochlorobenzene. The term "about 63% by weight of 2,4-dinitrophenoxyethanol" is herein defined to include a variation in the range of 60 to 65% by weight of 2,4-dinitrophenoxyethanol and about 37% by weight of bis(dinitrophenoxy)ethane is defined to include a variation in the range of 40–35% by weight of this component of the mixture.

The primary reaction product, 2,4-dinitrophenoxyethanol, melts at about 110° C. The bis(2,4-dinitrophenoxy)ethane melts at about 206° C. The mixture exhibits no definite melting point but liquifies over the temperature range of about 105° C. to 206° C. As such, bis(2,4-dinitrophenoxy)ethane is not a plasticizer but when in admixture with 2,4-dinitrophenoxyethanol in an amount less than about 50% by weight of said mixture the mixture is a suitable plasticizer for the polymeric materials of this invention. Relatively pure dinitrophenoxyethanol can be separated from the product mixture by digesting the mixture with hot benzene or hot toluene, and recovering the dinitrophenoxyethanol from cooled solvent.

When it is desired to obtain plasticized compositions having incipient gel points, defined as drop points, below about 120° C., such compositions may be obtained by adding to the composition adjunct plasticizers having melting points below about 100° C. Suitable adjunct plasticizers may be classified as esters of polyhydric alcohols, nitromonocyclic aromatics, esters of polycarboxylic acids, and polymeric esters. Examples are triethylene glycol di-2-ethylhexoate, triethylene glycol di-2-ethylbutyrate, polyethylene glycol di-2-ethylhexoate, dinitrotoluene, dialkyl phthalates, containing 1 to 8 carbon atoms per alkyl group, ethylene glycol diglycolate and triethyl citrate. The oxygen-containing plasticizers which are well known in this art are in general suitable for use as adjunct plasticizers. The amount of adjunct plasticizer used is based upon the specific adjunct plasticizer added, and on the particular properties desired in the plasticized composition. The thermoplastic composition of the invention may be used as such in forming high softening point films or in the molding or casting of shaped bodies. Or it may be used in conjunction with inert fillers to produce relatively rigid bodies which are not readily deformed.

In preparing the plasticized compositions of this invention, the dinitrophenoxyethanol-containing plasticizer is heated to a temperature of about 140°–150° C., the polymeric base material is then added incrementally and the mixture is stirred and milled to homogeneity. When an adjunct plasticizer is to be incorporated in the composition, it is first heated and the defined dinitrophenoxyethanol plasticizer is added before the addition of the polymeric material. When cooled the plasticized polymeric material varies in rigidity from tough horny material, but somewhat pliable, to a more rigid plasticized product, depending on the polymeric material plasticized and on the ratio of bis(dinitrophenoxy)ethane to the dinitrophenoxyethanol in the dinitrophenoxyethanol-containing plasticizer.

Crude 2,4-dinitrophenoxyethanol-containing primary and secondary reaction product was prepared by a modification of the Fairbourne and Toms method. To a 70 gallon kettle, equipped with a motor-operated stirrer and heating coils, was added 109 pounds of ethylene glycol and 102 pounds of technical grade 2,4-dinitrochlorobenzene to give a mol ratio of about 3,5 to 1, ethylene glycol to the dinitrochlorobenzene. The stirred mixture was heated to 65° C. and a 50% aqueous solution of sodium hydroxide containing 22.7 pounds and sodium hydroxide was added incrementally to the mixture over a period of two hours. The heat of reaction maintained the temperature in the range of 80°–95° C. without external heating. Following addition of the caustic solution the mixture was stirred for an additional two hours, the temperature being maintained at 80°–95° C., after which 30 gallons of water was added slowly. The precipitated solid was filtered and the filter cake was resuspended and washed in 40 gallons of water at a temperature of 60–70° C. and the suspension was then filtered hot. The filter cake was washed repeatedly with gallon portions of warm water. Traces of sodium dinitrophenoxide resulting from partial hydrolysis of the dinitrochlorobenzene intermediate were removed during the washing operation. The product was air-dried ten days at ambient temperature. The yield of air-dried product containing less than 1% moisture was 72.5 pounds of crude product which contained about 63 parts by weight of 2,4-dinitrophenoxyethanol and about 37 parts by weight of bis(2,4-dinitrophenoxy)ethane.

The pure 2,4-dinitrophenoxyethanol was prepared from the above crude product as follows:

The crude product was digested in hot toluene in a ratio of 5 ml. of toluene per gram of dried crude product. The mixture was filtered hot to separate the insoluble bis(2,4-dinitrophenoxy)ethane. The 2,4-dinitrophenoxyethanol crystallized from the solution on cooling to room temperature. This mixture was filtered and the crystallized 2,4-dinitrophenoxyethanol was dried. The melting point of this relatively pure 2,4-dinitrophenoxyethanol was about 105° C.

The examples below illustrate the plasticized compositions prepared with the 2,4-dinitrophenoxyethanol-containing plasticizer.

*Example 1*

The purified 2,4-dinitrophenoxyethanol obtained from the crude product as described above was heated to a temperature in the range of 140° C.–150° C. to obtain a molten plasticizer. To 70 parts by weight of the molten plasticizer was added incrementally 30 parts by weight cellulose acetate polymeric material of about 55% by weight acetic acid. The mixture was stirred (hot) to homogeneity. The plastic composition had a gel point, that is, drop point, of 122° C. which was determined as the temperature at which the molten composition ceased to separate in the form of drops from a thermometer bulb withdrawn from the mass of molten composition as it cooled. The composition was poured into a petri dish and allowed to cool to room temperature. The film of this composition was tough and flexible, exhibited good tear strength and maintained these properties upon aging.

*Example 2*

Compositions were prepared using as plasticizer samples of the above dried mixture containing about 63 parts by weight of 2,4-dinitrophenoxyethanol and about 37 parts by weight of bis(2,4-dinitrophenoxy) ethane to plasticize a sample of the cellulose acetate polymeric material as described in Example 1. One of these compositions contained 21% by weight of the cellulose acetate and 79% by weight of the 2,4-dinitrophenoxyethanol-containing mixture. The other composition contained 30% by weight of the cellulose acetate and 70% of the plasticizer mixture. The gel point of these compositions, was about 130° C. The mixtures of 2,4-dinitrophenoxyethanol-containing plasticizer and cellulose acetate were compatible. The plasticized products were tough and flexible.

While I have described my invention by means of examples of cellulose acetate polymeric material plasticized with purified 2,4-dinitrophenoxyethanol product and with 2,4 - dinitrophenoxyethanol - bis(2,4 - dinitrophenoxy)-ethane mixtures containing a relatively high percent of the bis(2,4-dinitrophenoxy)-ethane, I do not wish to be limited to such examples.

Having thus described my invention, I claim:

1. A thermoplastic composition consisting essentially of cellulose acetate containing between about 51 and 57 weight percent of acetic acid in an amount of about 20–40 weight percent and the remainder essentially a plasticizer selected from the class consisting of dinitrophenoxyethanol and mixtures of dinitrophenoxyethanol with bis-(dinitrophenoxy)ethane which mixtures contain not more than 50 weight percent of said bis(dinitrophenoxy)ethane.

2. The composition of claim 1 wherein said acetate contains about 55 percent by weight acetic acid.

3. The composition of claim 1 wherein said plasticizer consists of about 63% by weight of 2,4-dinitrophenoxyethanol and about 37% by weight of bis(2,4-dinitrophenoxy)ethane.

4. The composition of claim 1 wherein said plasticizer is 2,4-dinitrophenoxyethanol.

5. A thermoplastic composition consisting essentially of from about 20% to about 30% of cellulose acetate containing about 55 percent by weight acetic acid and from about 70% to about 80% of a plasticizer consisting of about 63% by weight of 2,4-dinitrophenoxyethanol and about 37% by weight of bis(2,4-dinitrophenoxy)ethane.

No references cited.